UNITED STATES PATENT OFFICE.

CARL RUMPFF, OF APRATH, NEAR ELBERFELD, PRUSSIA, GERMANY.

MANUFACTURE OF A NEW COLOR-PRODUCING ACID.

SPECIFICATION forming part of Letters Patent No. 256,381, dated April 11, 1882.

Application filed April 8, 1881. (Specimens.) Patented in England March 21, 1881, in France March 31, 1881, in Belgium April 15, 1881, and in Germany October 11, 1881.

*To all whom it may concern:*

Be it known that I, CARL RUMPFF, residing at Aprath, near Elberfeld, in the Kingdom of Prussia and Empire of Germany, have invented a new and useful Improvement in the Manufacture of a new Color-Producing Acid, consisting essentially in the preparation and utilization of a new monosulphonic acid of beta-naphthol, of which the following is a specification.

The action of the only monosulphonic acid of beta-naphthol known up to the present time upon the diazo compounds gives only very few color reactions of technical value. I have succeeded, however, in preparing a new monosulphonic acid of beta-naphthol, and by means thereof in preparing, partly by reaction upon the diazo compounds of the benzole series and naphthaline and partly by nitration, very valuable new coloring-matters, the preparation whereof is hereinafter described.

The nature and object of the present invention, therefore, is the preparation and separation of the said new monosulphonic acid of beta-naphthol and of coloring-matters therefrom by nitration, or by causing the same to react on diazo compounds, as hereinafter described.

Beta-naphthol-monosulphonic acid is formed (according to Schaefer, Ann. Chem., 152, 296) by heating beta-naphthol on the water-bath with double its weight of commercial or English sulphuric acid till perfect solution has taken place. By means of the lead salt the acid is obtained in a pure state. If, however, the process of sulphonization is conducted in such a way that the duration of the reaction of the excess of sulphuric acid upon the naphthol-monosulphonic acid already formed is as much as possible shortened, and the attainment of too high a temperature is avoided, a second isomeric naphthol-monosulphonic acid is formed besides that described by Schaefer, which is very essentially different in all its properties from the above-mentioned acid. It is especially in its different behavior toward nitric acid that the new sulphonic acid is very sharply distinguished from the acid described by Schaefer. For while no nitro products can be isolated from Schaefer's acid, my new sulphonic acid, when treated with nitric acid, very readily gives nitro compounds, the potassium salts of which are crystallizable compounds which dye wool and silk of a beautiful yellow. Besides this, the difference of the two isomeric monosulphonic acids is proved by the different solubility of their respective neutral-soda salts in spirits of wine of 90°. The neutral soda salt of the beta-monosulphonic acid described by Schaefer, $C_{10}H_6 < {ONa \atop SO_3} Na$, is nearly insoluble in boiling spirit of 90°, while the neutral soda salt of the new acid, on the contrary, dissolves therein with great facility and settles in beautiful and extremely hygroscopic crystals as the alcohol cools. The new acid and its neutral soda salt may be separated from Schaefer's acid and its neutral soda salt by this difference of solubility in alcohol.

In order to get a more copious yield of my new acid, (which I shall designate the "alpha-monosulphonic acid of beta-naphthol,") I proceed as follows: One hundred kilograms of finely-powdered beta-naphthol freed from moisture are mixed as quickly as possible with two hundred kilograms of commercial sulphuric acid, (66°.) The mixture heats spontaneously with great rapidity; but care must be taken that the temperature does not exceed 50° to 60° centigrade, because if the temperature is only a few degrees higher, and if sulphuric acid is at the same time present in excess, the new monosulphonic acid passes very quickly over into the common monosulphonic acid. The naphthol is very soon dissolved in the sulphuric acid. As soon as this point is reached (which generally requires no more time than ten to fifteen minutes, and which can be most easily recognized by the fact that when it is reached a sample of the melt saturated with ammonia gives a clear solution on the addition of diazo-benzole) the melt is poured into cold water. It then contains a mixture of two different sulphonic acids of beta-naphthol. The neutral soda salts of the monosulphonic acids thus formed are prepared and dried in the usual manner. The crude mixture of these salts is treated with from three to four parts of boiling spirit of 90° and filtered hot. The soda salt of the monosulphonic acid described by Schaefer remains nearly perfectly undissolved. The salt of the new sulphonic acid, on the contrary, passes into solution and crystallizes in fine large crystals as the solution grows cold, the mother-liquor being separated by a mechanical method of separation. This spirit-soluble salt gives, in combination with the diazo compounds, coloring-matters fast against soap and light, the shades of which are on the whole yellower than those of the azo dye-stuffs prepared from the common beta-naphthol-monosulphonic acid.

If I use for azotizing free amidoazo-benzole instead of its monosulphonic acid, I get a dye-stuff which possesses a somewhat more yellowish, but withal extremely clear, shade. The homologues of amidoazo-benzole and their monosulphonic acids give correspondingly bluer shades. Diazoazo-benzole and its homologues give with the new alpha-monosulphonic acid reddish-yellow tints or tones drawing to orange; alpha-diazo-naphthaline a bluish-red; beta-diazo-naphthaline a more brick-red dye-stuff.

Instead of the diazo compounds from benzole and its homologues, toluol-xylol, &c., the diazo compounds obtained from the other members of the benzole series, which are not homologues in the ordinary sense of the term, may be employed—as, for instance, the diazo compounds or derivatives of ethyl-xylol, ethyl-benzole, ethyl-methyl-xylol, and other compounds of benzole and its homologues with other alcoholic residues, as also the diazo derivatives of the said bodies, which are substituted with the sulphonic group, all of which I comprehend in the general expression "diazo compounds" or derivatives of the benzole series, as well as the diazoazo derivatives of the benzoles and naphthaline. These results of the use of the new alpha-monosulphonic acid I do not here claim.

The alpha-monosulphonic acid of beta-naphthol (in contrast to the monosulphonic acid described by Schaefer) gives, when treated in aqueous solution with nitric acid, nitro products the alkali salts of which are fine yellow dye-stuffs or coloring-matters easily soluble in water.

I am aware that beta-naphthol has been treated with sulphuric acid, both commercial and fuming, of various strengths, so as to form a monosulpho-acid of beta-naphthol; but such attempts, owing to differences of temperature exhibited and proportions of acid and naphthol, have resulted in producing compounds possessing different chemical constitution or amounts of acid and base, and are of the nature of mixtures of different sulphonic acids, and as yet no true monosulpho-acid of beta-naphthol has been so produced, while, on the contrary, the compound formed according to the process herein described results solely in the production of a pure alpha-monosulpho-acid of beta-naphthol.

Although I have described the making of various colors or dye-stuffs by the use of the acid herein claimed, I do not here claim the process or the separate coloring-matters, as the same will constitute the subjects of other applications for Letters Patent.

I claim—

1. The mode described of producing the alpha-monosulphonic acid of beta-naphthol, which consists in treating beta-naphthol with commercial sulphuric acid of the strength and at the temperature and in the proportions substantially as herein set forth.

2. As a new product, the alpha-monosulphonic acid of beta-naphthol, substantially as described.

3. As a new product, the soda salt of alpha-monosulphonic acid of beta-naphthol, substantially as described.

CARL RUMPFF.

Witnesses:
J. FERD. KEDENBURG,
WILHELM SCHULTER.